(No Model.)

R. NEWTON.
SEWER TRAP.

No. 478,808. Patented July 12, 1892.

WITNESSES:
M. F. Bligh
Chas. H. Luther Jr.

INVENTOR:
Robert Newton
by Joseph A. Miller & Co.
Attys.

UNITED STATES PATENT OFFICE.

ROBERT NEWTON, OF PROVIDENCE, RHODE ISLAND.

SEWER-TRAP.

SPECIFICATION forming part of Letters Patent No. 478,808, dated July 12, 1892.

Application filed May 23, 1891. Serial No. 393,908. (No model.)

*To all whom it may concern:*

Be it known that I, ROBERT NEWTON, of the city of Providence, in the county of Providence and State of Rhode Island, have invented a new and useful Improvement in Sewer-Traps; and I hereby declare that the following is a full, clear, and exact description of the same, reference being had to the accompanying drawings, forming part of this specification.

This invention has reference to an improvement in the class of sewer-traps in which a water seal is secured to shut off the flow of sewer-gas; and it consists in the peculiar construction of the trap, as will be more fully set forth hereinafter.

In water-seal sewer-traps it is essential that sufficient water shall at all times be retained in the trap to form a good and sufficient water seal, by which the sewer-gases are prevented from entering the house. In most of the traps as heretofore constructed the partial vacuum formed by the column of water in the discharge-pipes caused the water in the trap to be lifted by the atmospheric pressure in the supply-pipe, so that, if not all, at least so much of the water in the trap was discharged that not sufficient water remained to form a practical seal to prevent the sewer-gas from entering the house.

The object of this invention is to so construct a trap in which the siphon will be broken as soon as, after the first inrush of the water to the trap, air may enter the trap, so that a sufficient quantity of water must at all times remain in the trap to secure a practical and sufficient seal.

Figure 1:
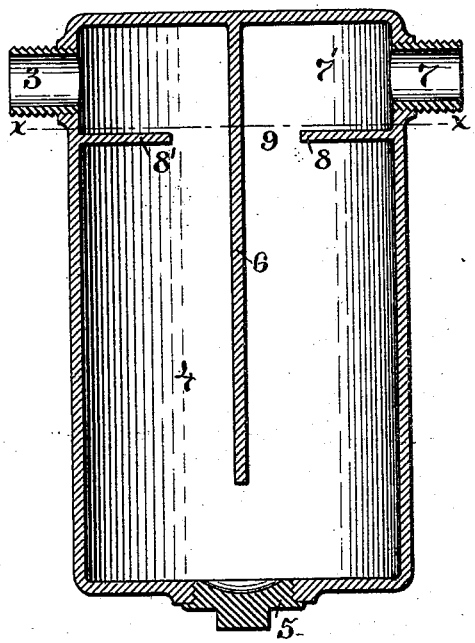
Figure 2:
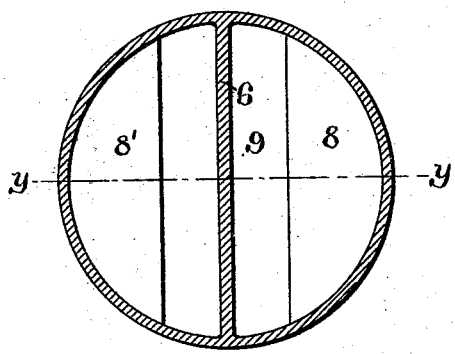

Figure 1 is a vertical cross-section through the center of the trap on the line Y Y of Fig. 2. Fig. 2 is a horizontal cross-section on the line X X of Fig. 1.

The numeral 3 indicates the inlet to the chamber 4, preferably made of cylindrical form, closed on top, and provided with the plug 5 at the bottom. This chamber is divided from the top downward to near the bottom into two parts by the central partition 6. The outlet 7 is practically on the same level with the inlet, but on the side opposite the inlet and divided from it by the partition 6. Below the outlet 7 the partition 8 extends horizontally toward the vertical partition 6, so as to close in a portion of the main chamber, separating the main chamber 4 from the outlet-chamber 7' partially and leaving only a narrow slit 9 between the horizontal partition 8 and the vertical partition 6.

The operation of this trap is as follows: When properly connected and the water from a basin, a tub, or other source is allowed to flow through the trap, the trap will be filled with water, and until the supply diminishes the water will flow through the trap. When the supply diminishes, the weight of the column of water in the discharge-pipe will form a siphon, and the atmosphere will depress the water on the inlet side of the partition 6 and raise the water on the outlet side of the partition 6 until the air can pass under the lower edge of the central partition 6 and pass to the outlet 7 to break the siphon. Owing to the horizontal partition 8 the air after passing under the partition 6 is compelled to pass up along the side of this vertical partition and through the long narrow opening 9, turning the corner over the edge of the partition 8 to pass to the outlet. When the air can first pass under the lower edge of the partition 6, the atmospheric pressure still acts on the water in the bottom of the trap on the inlet side, and consequently, owing to the difference in pressure caused by the siphon, the water fills the outlet side of the trap until the siphon is broken by the air. At this time the quantity of water retained in the trap is much greater, owing to the horizontal partition 8, than it would be if the outflow were not so restricted. This extra quantity of water, the water still flowing into the trap, finds its level as soon as the siphon is broken and forms an ample and sufficient depth of water to secure a practically perfect seal. The horizontal partition 8 also directs the air-currents and prevents the air and water from forming induced currents, by which the siphon is maintained after the air is passing under the vertical partition 6 when the horizontal partitions are not used.

In practice I find that the length of the lower edge of the vertical partition and the length of the opening 9 form important factors and that the area of the opening 9 should be no less than the area of the outlet 7.

For the purpose of facilitating the practical use of this trap I place the horizontal partition 8 also in the inlet part of the trap and have marked the same 8'. When so constructed, the sides may be exchanged and the workman may connect either side with either the inlet or outlet. In practice this is a very important point, as it prevents the possibility of securing the trap in the wrong position.

Having thus described my invention, I claim as new and desire to secure by Letters Patent—

1. In a trap, the combination, with a chamber divided by a vertical partition extending from the upper end of the chamber downward to near the bottom and having inlet and outlet openings near the upper end, of a horizontal partition extending from the side of the chamber below the outlet toward the central vertical partition, as described.

2. A sewer-trap having a chamber divided by a vertical partition into a downward and upward duct or chamber provided at their upper ends with lateral inlet and outlet openings, and a horizontal partition extending from the side of the chamber below the lateral outlet-opening toward the vertical partition, so as to form a long and narrow opening between the vertical and the horizontal partitions, as described.

3. In a sewer-trap, the combination, with the chamber 4, divided by the partition 6 into inlet and outlet chambers, the inlet 3, and outlet 7, of the partitions 8 and 8', dividing the inlet and outlet from the chamber 4, adapted to contract the inlet and outlet and permit the reversal of the trap, as described.

4. A trap consisting of a cylindrical chamber having inlet and outlet openings on opposite sides near one end, divided part of its length by a central partition extending from the top to near the bottom of the chamber, and at one end provided with a plug and having two partitions extending horizontally from the sides below the inlet and outlet chambers, and openings toward the central partition, so as to form on each side of the partition long narrow openings connecting the inlet and outlet with the body of the trap-chamber, as described.

ROBERT NEWTON.

Witnesses:
JOSEPH A. MILLER,
JOSEPH A. MILLER, Jr.